(12) United States Patent
Floyd

(10) Patent No.: US 7,210,282 B1
(45) Date of Patent: *May 1, 2007

(54) CASE BURNING ROCKET

(76) Inventor: Brian A. Floyd, 101 Reinhart Cir., Madison, AL (US) 35758

( * ) Notice: Subject to any disclaimer, the term of this patent is extended or adjusted under 35 U.S.C. 154(b) by 384 days.

This patent is subject to a terminal disclaimer.

(21) Appl. No.: 10/916,352

(22) Filed: Aug. 11, 2004

Related U.S. Application Data

(60) Continuation-in-part of application No. 10/037,365, filed on Jan. 4, 2002, now Pat. No. 6,782,693, and a division of application No. 10/910,400, filed on Aug. 3, 2004.

(51) Int. Cl.
*F02K 9/32* (2006.01)

(52) U.S. Cl. .......................................... 60/204; 60/255

(58) Field of Classification Search ................. 60/204, 60/234, 251, 253, 254, 255; 102/287, 291
See application file for complete search history.

(56) References Cited

U.S. PATENT DOCUMENTS

| | | | |
|---|---|---|---|
| 3,032,970 A * | 5/1962 | Fox .............................. | 60/253 |
| 3,127,739 A | 4/1964 | Miller | |
| 3,280,746 A | 10/1966 | Brown | |
| 3,326,129 A | 6/1967 | Gould | |
| 3,379,010 A * | 4/1968 | Harvey ......................... | 60/253 |
| 3,479,818 A | 11/1969 | Strobl | |
| 3,802,192 A | 4/1974 | Curran | |
| 3,973,397 A | 8/1976 | Chase et al. | |
| 4,119,036 A | 10/1978 | Hayashi et al. | |
| 4,180,535 A | 12/1979 | Rhoades | |
| 4,956,971 A | 9/1990 | Smith | |
| 5,070,691 A | 12/1991 | Smith et al. | |
| 5,675,966 A | 10/1997 | Dombrowski et al. | |
| 5,718,113 A | 2/1998 | Hayes | |
| 6,357,357 B1 | 3/2002 | Glasser | |
| 6,782,693 B1 * | 8/2004 | Floyd .......................... | 60/204 |

OTHER PUBLICATIONS

U.S. Appl. No. 10/037,365, filed Jan. 4, 2002, by Brian Floyd.
Charles Glenn and Thomas Maultsby, DoD Reverses Strategy on Evolved Expendable Launch, Launchspace Magazine Apr./May Edition, pp. 41-43.
World Book Encyclopedia 1991 Edition, vol. Q-R, pp. 384 and 389.
Mechanical Design and Systems Handbook, section 20.3 and table 20.28.
Carbon/Graphite Database-Composite Materials, Online, http://composite.about.com/libarary./data/b1carbon.htm.

(Continued)

*Primary Examiner*—L. J. Casaregola
(74) *Attorney, Agent, or Firm*—Waddey & Patterson, P.C.; Howard H. Bayless

(57) ABSTRACT

A case-burning rocket booster includes a combustible case containing a solid rocket fuel, a combustion chamber adjustably coupled to the case for burning the case and the solid rocket fuel, a nozzle connected to the combustion chamber for expelling the burned case and fuel to generate thrust, and a drive system for pulling the combustion chamber and nozzle up the case as the case and fuel burn. A hybrid version of the case-burning rocket also includes an oxidizer supply system for supplying varying amounts of oxidizer to the combustion chamber to vary the thrust generated by burning the case and the fuel.

19 Claims, 7 Drawing Sheets

OTHER PUBLICATIONS

NASA Specification SP-8025, Apr. 1970, "Solid Rocket Motor Metal Cases".
NASA Specification SP-8115, Jun. 1975 "Solid Rocket Nozzles".
Parker Seals O-Ring Handbook, Mar. 1982 Edition, pp. A3-1-A3-45.
TIMKEN Bearing Selection Handbook, 1983 Edition, pp. 187-198.

* cited by examiner

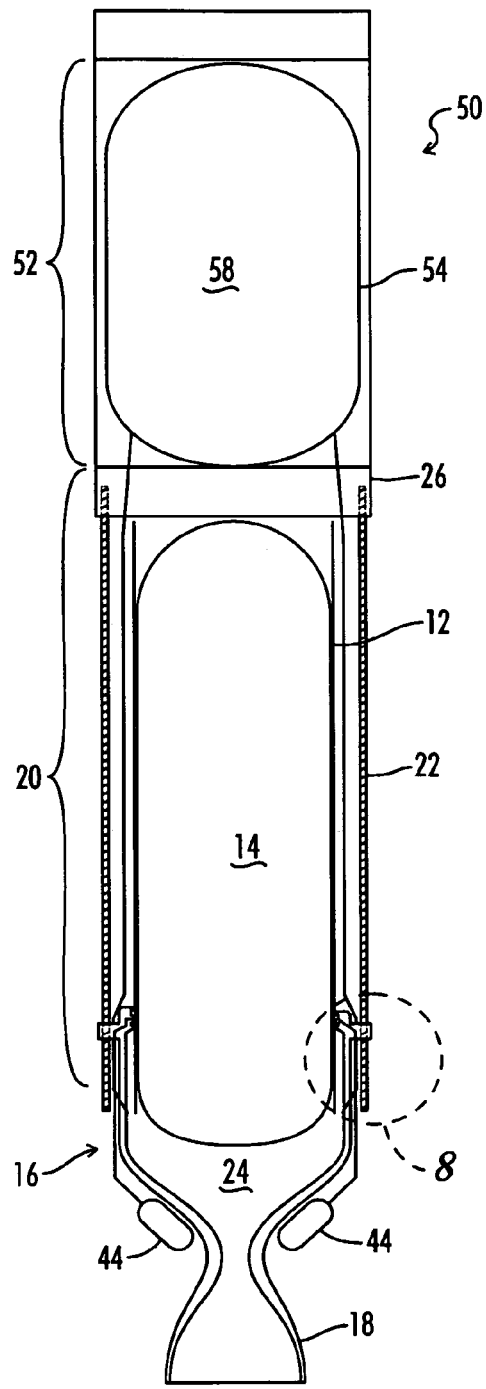
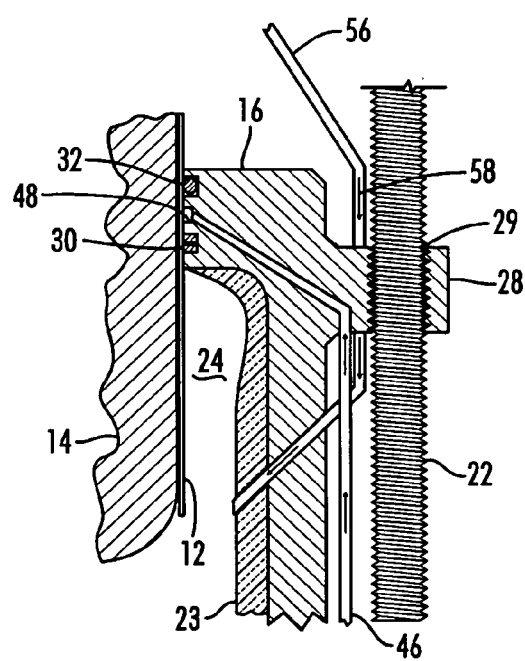
FIG. 7
FIG. 8

_US 7,210,282 B1_

CASE BURNING ROCKET

CROSS-REFERENCES TO RELATED APPLICATIONS

This application is a Continuation-In-Part application which claims benefit of U.S. patent application Ser. No. 10/037,365 filed Jan. 4, 2002, now U.S. Pat. No. 6,782,693, entitled "Case Burning Rocket" which is hereby incorporated by reference, and benefit of co-pending, divisional U.S. patent application Ser. No. 10/910,400 to filed Aug. 3, 2004 entitled "Method of Making a Threaded Rod for a Case Burning Rocket" which is also hereby incorporated by reference.

BACKGROUND OF THE INVENTION

The present invention relates generally to solid rocket boosters. More particularly, this invention pertains to a case-burning solid rocket booster.

Core-burning solid rocket boosters are known in the art and are typically fast burning systems that produce large amounts of thrust. These systems burn solid rocket fuel from the inside of the solid rocket fuel core outward to the pressure containing case enclosing the core. This type of burn pattern is designed to minimize exposure of the case to the intense heat of combustion.

While this type of burn pattern produces high thrust, it also produces short burn times and, as a result, core-burning solid rocket boosters require multiple stages to reach orbit or to propel long-range missile systems. Examples of typical multiple-stage solid rocket boosters are described in U.S. Pat. No. 5,070,691, issued to Smith et al. on Dec. 10, 1991 and entitled "Solid Propellant Canister Loaded Multiple Pulsed or Staged Rocket," and U.S. Pat. No. 4,956,971, issued to Smith on Sep. 18, 1990 and entitled "Solid Propellant Canister Loaded Multiple Pulsed Or Staged Rocket Motor." Multiple-stage solid rocket boosters, however, are more complex than single-stage solid rocket boosters and are undesirable in some applications for this reason.

Core-burning solid rocket boosters also usually include a layer of insulation on the interior of the case in order to further protect the case from the heat of combustion. In some applications, however, this layer of insulation is undesirable because it adds weight and decreases overall rocket performance.

What is needed, then, is a solid rocket booster system that reduces to one stage or minimizes the number of stages required to reach orbit or to propel a long-range missile system and that does not require a layer of insulation to protect the case containing the solid rocket fuel from the heat of combustion.

SUMMARY OF THE INVENTION

Accordingly, one object of the present invention is to provide a solid rocket booster that requires fewer stages to reach orbit or to propel a long-range missile system.

Another object of the present invention is to provide a solid rocket booster that does not require a layer of insulation to protect the case containing the solid rocket fuel.

These objects, and other objects that will become apparent to someone practicing the present invention, are satisfied by a case-burning solid rocket booster that includes a case containing a solid rocket fuel, a combustion chamber connected to the case for burning the case and the solid rocket fuel, a nozzle connected to the combustion chamber for expelling the burned case and fuel to generate thrust, and a drive system for pulling the combustion chamber and nozzle up the case as the case and fuel burn. In an alternative embodiment, a hybrid version of the case-burning rocket includes an oxidizer supply system for supplying varying amounts of oxidizer to the combustion chamber to vary the thrust generated by burning the case and the fuel. In either embodiment, the booster of the present invention burns the case as well as the solid rocket fuel and thereby increases the amount of thrust produced by the booster. As a result, fewer stages are required to reach orbit or to propel a long-range missile system. In addition, no layer of insulation is required to protect the case containing the solid rocket fuel for the booster of the present invention because the case is actually consumed during the combustion process thereby increasing overall rocket performance.

BRIEF DESCRIPTION OF THE DRAWINGS

FIG. 7 is a cross-sectional view of one embodiment of the present invention of a hybrid case-burning rocket booster.

FIG. 8 is an enlarged cross-sectional view of the assembly of the embodiment shown in FIG. 7 showing fluid and oxidizer flow into the combustion chamber.

DESCRIPTION OF THE PREFERRED EMBODIMENTS

Figure 1:
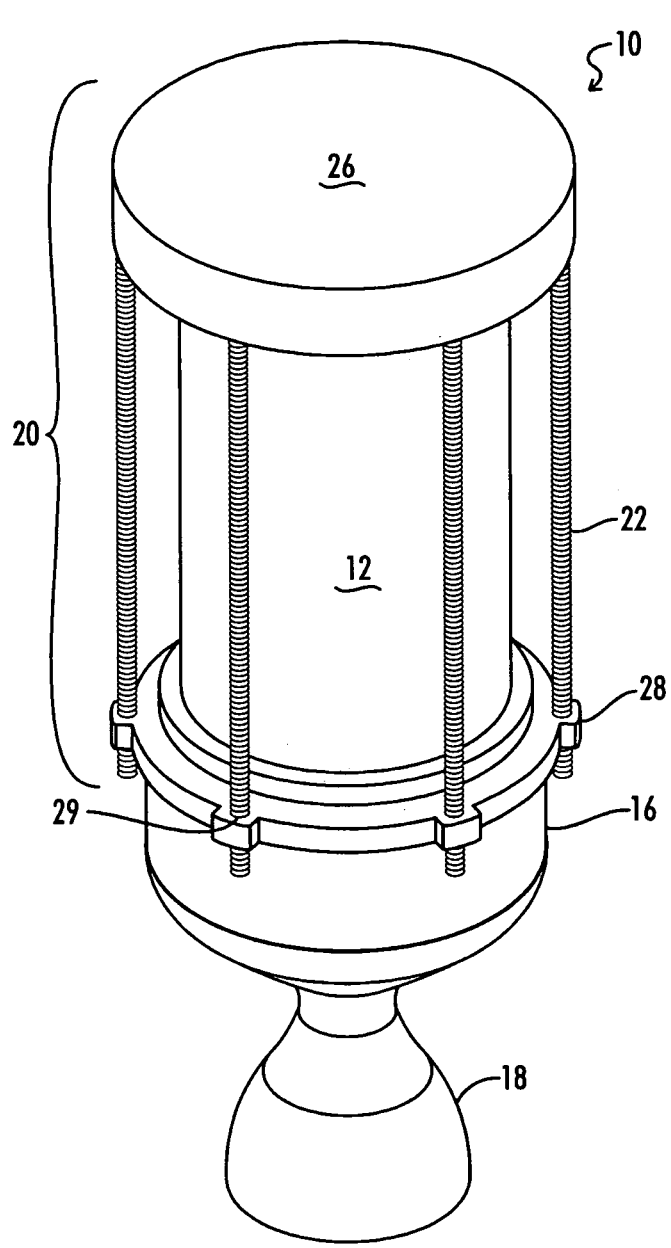
FIG. 1 is a perspective view of one embodiment of the present invention of a case-burning rocket booster.

Referring to FIG. 1, one embodiment of the present invention of a case-burning rocket booster 10 includes a case 12 containing a solid rocket fuel 14 (see FIGS. 3 and 4), a combustion chamber 16 connected to the case 12 for burning the case 12 and the fuel 14, a nozzle 18 connected to the combustion chamber 16 for expelling the burned case and fuel to generate thrust, and a drive system 20 connected to the combustion chamber 16 for pulling the combustion chamber 16 and nozzle 18 up the case 12 as the case 12 and the fuel 14 burn.

The case 12 is made out of a structural but combustible material and is burned in the combustion chamber 16 along with the solid rocket fuel 14. As the case burns, the overall thrust provided by the booster 10 increases because of the additional mass flow through the nozzle 18. In one embodiment, the case is made out of a graphite epoxy composite and includes a combustion enhanced epoxy resin. This type of structural material is best suited for large-scale rocket motors because of its high strength to weight ratio, its smooth outer surface and its ease of fabrication. In other embodiments, however, the case can be made out of other combustible materials. In this embodiment, the case 12 includes a layer of oxidizer rich fuel next to the case wall (not shown) to enhance the burning of the case 12 in the combustion chamber 16.

One advantage provided by the case-burning rocket booster 10 of the present invention is the fact that the case 12 is burned and then expelled through the nozzle 18 to produce a net gain in thrust. Another advantage is the fact that the booster 10 of the present invention does not require a layer of insulation inside the case 12 to protect the case from exposure to the heat of combustion.

The case 12 is designed to be combustible at a temperature generated in the combustion chamber, which is approximately 6,000 degrees Fahrenheit. In most applications, this temperature will provide sufficient heat to assure combustion of a graphite epoxy composite case. In applications where this temperature is insufficient to assure combustion, another material must be added to the composite case 12 to assure combustion of the case 12. Finally, if necessary, combustible metallic powder, such as aluminum or magnesium powder, may be added to the epoxy resin, or combustible metallic threads, such as aluminum or magnesium threads, may be added to the graphite weave to enhance the combustion rate of the case 12.

The case 12 is also designed to withstand the pressures generated by a conventional combustion chamber. While combustion pressures can vary depending on the application and the rocket size, most larger rocket boosters will have chamber pressures of approximately 500 pounds per square inch. Accordingly, in this embodiment, the case 12 has a case wall thickness of approximately 1.5 inches. In other applications, where the combustion chamber pressures are greater, the case 12 may require a wall thickness greater than 1.5 inches.

Figure 13:
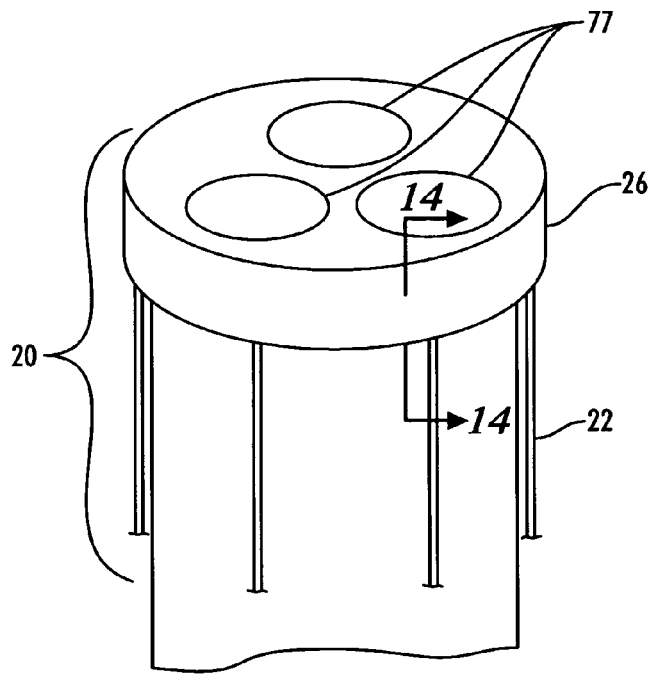
FIG. 13 is an enlarged drawing of one embodiment of the drive system of the present invention.
Figure 14:
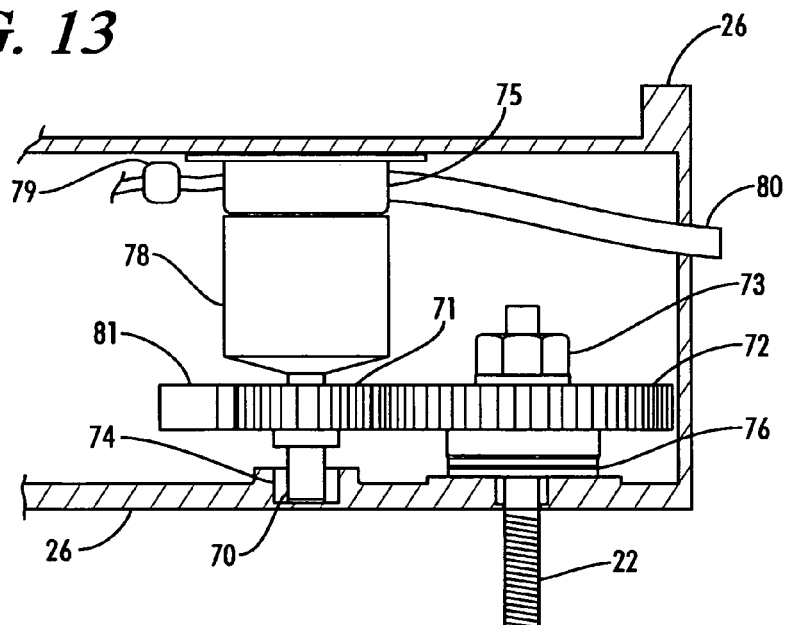
FIG. 14 is a view of the drive system shown in FIG. 13 taken along the C—C section line.

Referring to FIGS. 13 and 14, the drive system 20 includes a series of metal threaded rods 22 and a motor or engine 75, which is enclosed in a base 26. The motor or engine 75 is connected to the threaded rods 22 and is operable to turn the threaded rods 22 as the case 12 and fuel 14 are burned in the combustion chamber 16, thereby pulling the combustion chamber 16 and nozzle 18 up the case 12. In the embodiment shown in FIGS. 13 and 14, the turbine engine 75 burns tanked liquid fuel and oxidizer 77, which is supplied to the engine 75 through an inlet 79, located in the base 26. Engine exhaust is directed away from the system 20 through an exhaust port 80. The amount of fuel 77 supplied to the engine 75 is determined by the required speed for the threaded rods 22. The required speed of the threaded rods is, in turn, determined by the rate at which the case 12 and fuel 14 burn. The case and fuel burn rate is determined by either a direct feed back system (not shown), such as thermal couples (not shown), that measures the rate of solid fuel and case combustion or a pre-programmed drive rate that matches the predicted burn rates of the solid fuel 14 and case 12.

The turbine engine 75 drives a high reduction gear train 78 in a self-contained housing. The gear train 78 includes an output shaft 70 and an output gear 71 that is supported by a bearing 74. The output gear 71 meshes with the main rod drive gears 72 located on each of the threaded rods 22. The drive gears 72 are held in place by nuts 73 attached to the threaded rod 22 and supported by a thrust bearing 76. In this embodiment, a ring gear 81 mechanically equalizes the position of all the gears 72 in the drive system 20.

Figure 9:
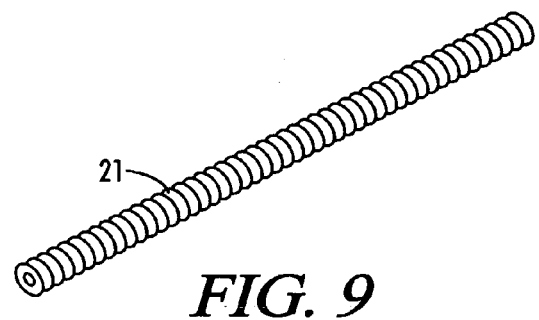
FIG. 9 is a perspective view of one embodiment of the composite steel rod of the present invention.
Figure 10:
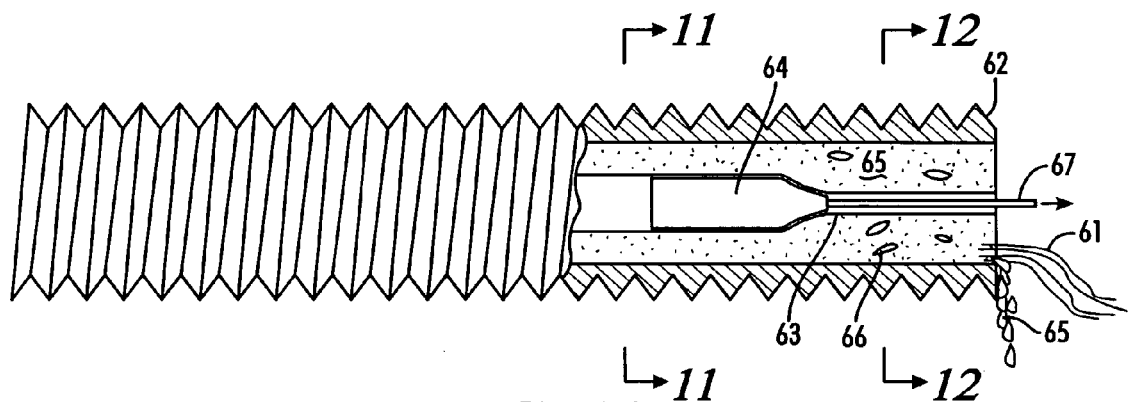
FIG. 10 is a partial cross-sectional view of composite steel rod of the present invention showing a mandrel being pulled through a collapsed sleeve disposed in the rod.
Figure 11:
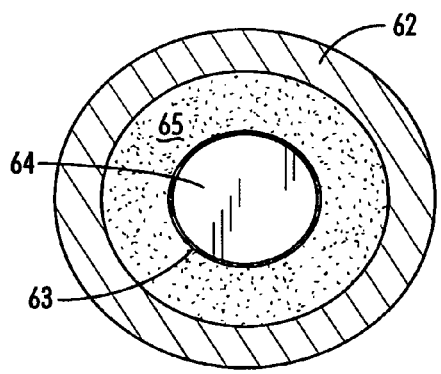
FIG. 11 is a view of the rod shown in FIG. 10 taken along the 11—11 section line.
Figure 12:
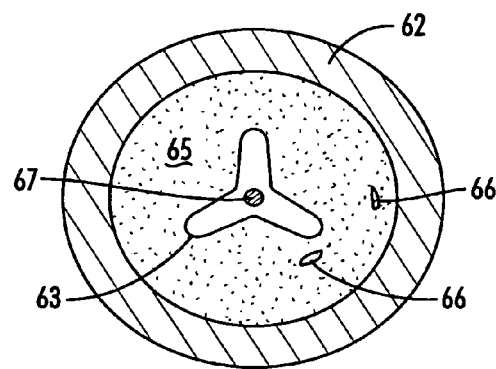
FIG. 12 is a view of the rod shown in FIG. 11 taken along the 12—12 section line.

In an alternative embodiment, the metal threaded rods 22 are replaced with a composite/steel threaded tension rod 21 (See FIG. 9). The rod 21 is fabricated by pulling epoxy resin saturated graphite yarn 61 wrapped around a metal collapsed sleeve 63 through a hardened steel outer tube 62. A mandrel 64 is then pulled through the collapsed sleeve 63 using a pull rod or cable 67, thereby expanding the sleeve 63 and compressing the mix of graphite yarn 61 and epoxy resin 65 against the outer tube 62. As a result, excess epoxy resin 65 and air bubbles 66 are forced out of the tube 62. This method of fabrication provides the same compression effect as an auto-clave. A conventional auto-clave, however, can only be used to provide external pressure. The graphite/epoxy mix, the expansion sleeve, and the outer threaded shell are bonded together as the resin cures to form a lightweight completed assembly The combustion chamber 16 is cylindrical in shape and includes a series of flanges 28 having threaded openings 29 so that the combustion chamber 16 is pulled up the case 12 toward the base 26 when the motor or engine rotates the threaded rods 22. In one embodiment, the combustion chamber 16 also includes a layer of insulation 23 (see FIG. 3) for protecting the interior of cavity 24 of combustion chamber 16 from the heat of combustion. In an alternative embodiment, the threaded rods 22 are designed to be broken apart using explosive cutting charges (not shown) as the rods 22 pass through the threaded openings 29, thereby reducing the weight of the booster 10 and preventing portions of the threaded rods 22 from extending into the rocket exhaust as the fuel 14 burns. In another alternative embodiment, the drive system 20 includes cables and spools instead of threaded rods to move the combustion chamber 16 and nozzle 18 up the case 12.

Figure 2:
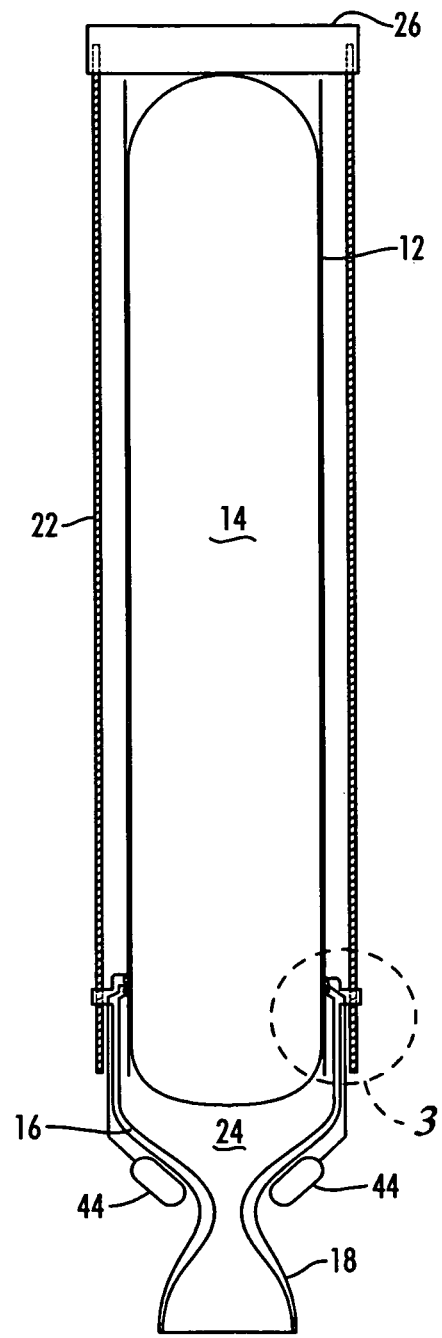
FIG. 2 is a cross-sectional view of the embodiment shown in FIG. 1.
Figure 3:
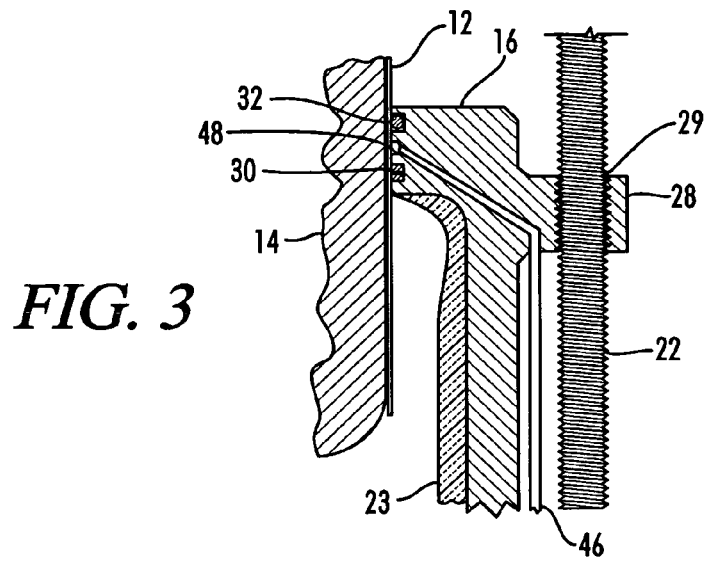
FIG. 3 is an enlarged cross-sectional view of the combustion chamber seal assembly of the embodiment shown in FIGS. 1 and 2.
Figure 4:
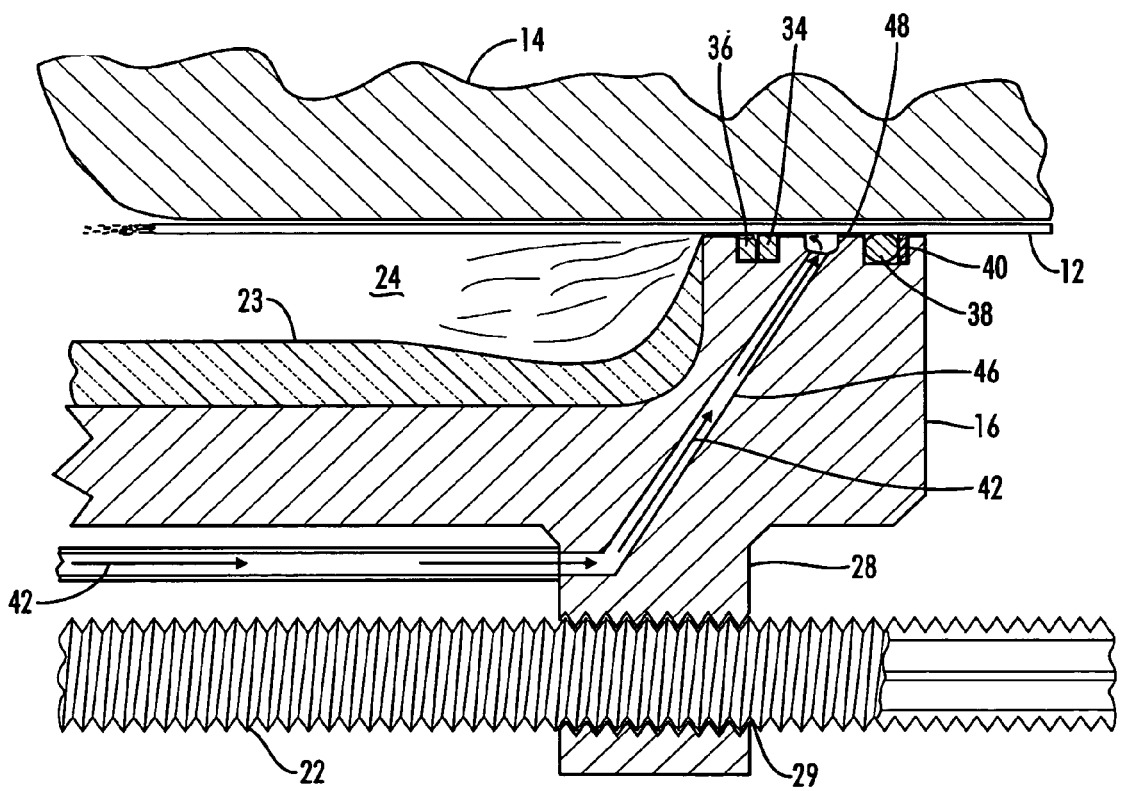
FIG. 4 is an enlarged cross-sectional view of the seal assembly of the embodiment shown in FIGS. 1 and 2 showing fluid flow into the combustion chamber.
Figure 5:
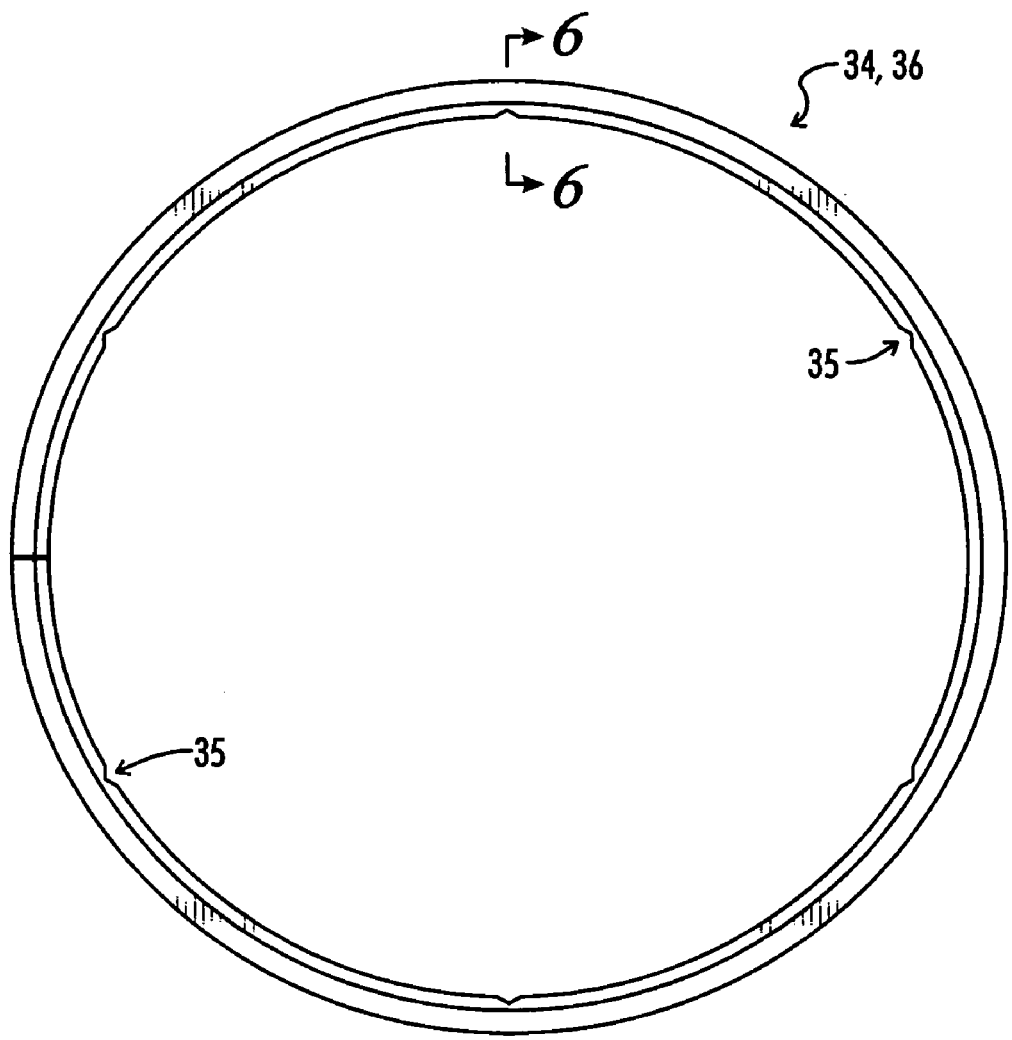
FIG. 5 is a top view of the seal used with one embodiment of the present invention.
Figure 6:
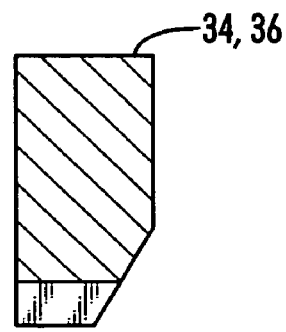
FIG. 6 is an enlarged cross-sectional view of the seal shown in FIG. 5.

Referring to FIGS. 2 and 3, the combustion chamber 16 is sealed to the case 12 using a unique sealing systems 29 (see FIG. 15), which prevents high temperature gasses from escaping from the combustion chamber 16. The system 29 includes a pair of seals, 30 and 32, with fluid trapped between the two seals in a fluid compartment 48, to prevent combustion leaks. In one embodiment, seal 30 includes two heat-resistant metal rings, 34 and 36, and seal 32 includes an elastomer ring 38 to prevent fluid from passing by seal 38 and a backing ring 40 (see FIGS. 4–6). The rings, 34 and 36, include a series of notches 35, which allow some fluid to flow past the rings. When in use, the rings, 34 and 36, are oriented so that the notches 35 of each ring are misaligned. As a result, while the rings, 34 and 36, prevent a substantial portion of any fluid from passing the rings, some fluid can pass through the notches 35 of one ring and then through the notches 35 of the other ring into the combustion chamber 16.

Figure 15:
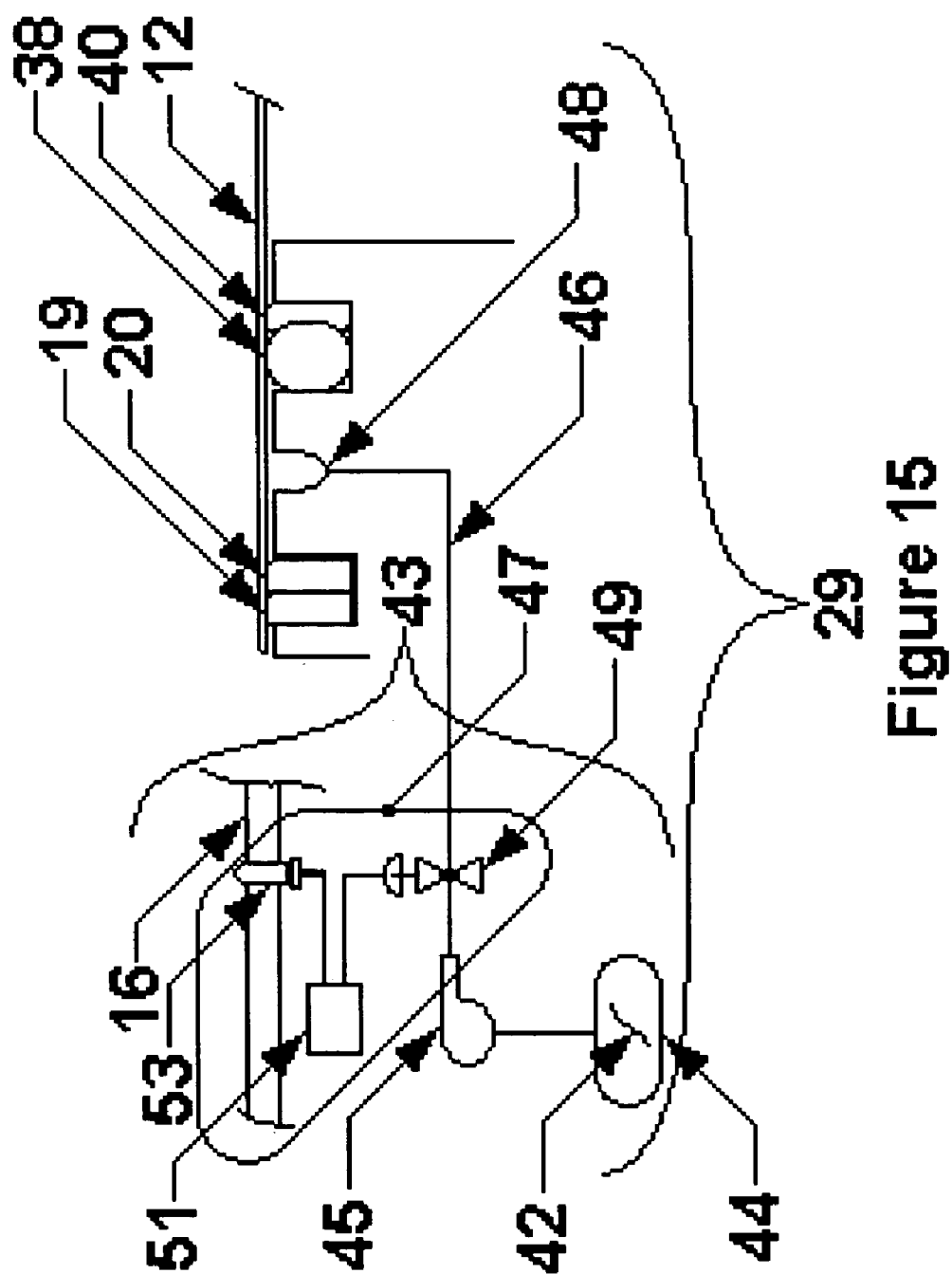
FIG. 15 is a schematic view of sealing system of the embodiment shown in FIGS. 1 and 2.

Referring to FIG. 15, the sealing system 29 also includes a fluid supply system 43 that includes a fluid container 44, a fluid channel 46, and a pump 45, and a fluid pressure control system 47, which includes a pressure control valve 49, a pressure modulator 51, and a pressure transducer 53 to measure combustion chamber pressure.

To prevent super hot rocket gasses from blowing past the seals, fluid 42 is pumped, using the pump 45, from the fluid container 44 (FIG. 2) into the combustion chamber 16 through the fluid channel 46 and into fluid compartment 48 located between seal 30 and seal 32. The pressure of the fluid 42 between the seals (hereinafter referred to as the "seal pressure") is maintained above the pressure in the combustion chamber 16 using the fluid pressure control system 47.

At rocket booster start up, the pump 45 pressurizes the fluid compartment 48 to a seal pressure that is a preset differential pressure above the anticipated start up combustion chamber pressure. In one embodiment, a start up algorithm contained in the pressure modulator 51 selects a preset differential pressure of approximately 50 pounds per square inch (PSI) and maintains seal pressure approximately 50 PSI above the anticipated start up combustion chamber pressure. As soon as the seal pressure reaches the preset differential pressure above the combustion chamber pressure, the pressure modulator 51 provides a data signal to a rocket control circuitry (not shown) to ignite the rocket fuel 14. Once the fuel 14 is ignited, the pressure transducer 53 provides a combustion chamber pressure data signal to the fluid pressure control system 51. Based on the combustion chamber pressure data signal, the pressure modulators 51 directs the pressure control valve 49 to incidentally open or close in order to maintain seal pressure between 20 to 70 PSI above the combustion chamber 16 pressure through out the rocket burn cycle. The pressure modulator 51 contains an algorithm that assures that sufficient fluid 42 flows through the fluid compartment 48 to prevent over heating of the seals 19, 20, 38 and 40. The pressure control valve 49 provides fluid pressure data back to the pressure modulator 51 during all operations.

As a result of the pressure differential between the seal pressure and the combustion chamber pressure, some fluid 42 leaks past seal 30 and is burned in the combustion chamber 16. This leakage prevents overheating of the fluid 42 between the seals, 30 and 32. Furthermore, as the leakage fluid vaporizes in the combustion chamber 16, it absorbs heat and prevents the seal 30 and case 12 from being exposed to excessive heat in the low temperature volume area 15 (see FIG. 15) in the combustion chamber. The combustion chamber insulation liner 23 is profiled in a manner that causes this low temperature volume area to be created. In one alternative embodiment, the fluid 42 is flammable to facilitate case combustion and provides initial burning and heating the case 12.

Referring to FIGS. 7 and 8, one embodiment of the present invention of a hybrid case-burning rocket booster 50 is shown. The hybrid booster 50 is identical to the booster 10 discussed above with the exception of an oxidizer supply system 52. In addition, in some alternative embodiments, the drive system 20 and the combustion chamber 16 can be reduced in size. This hybrid concept provides the ability to throttle the rocket during ascent as well as provides a way to terminate combustion, and restart combustion if necessary. More specifically, the hybrid booster 50 includes the case 12, combustion chamber 16, nozzle 18, and drive system 20 of the booster 10 described in detail above. The oxidizer supply system 52 includes a liquid oxidizer tank 54 and an oxidizer channel 56 for supplying liquid oxidizer 58 to the combustion chamber 16, which increases the amount of thrust generated by the booster 50 when compared to the thrust generated by burning only the case 12 and fuel 14. In addition, the oxidizer supply system 52 also includes a throttle assembly (not shown) for controlling the amount of liquid oxidizer 58 supplied to the combustion chamber 16 and thereby controlling the amount of thrust generated by the booster 50. Using the oxidizer supply system 52, the hybrid booster 50 can be throttled in a manner that is similar to a liquid rocket without the need for cryogenic storage of hydrogen.

Thus, although there have been described particular embodiments of the present invention of a new and useful Case Burning Rocket, it is not intended that such references be construed as limitations upon the scope of this invention except as set forth in the following claims.

The invention claimed is:

1. A rocket booster, comprising:
 a combustible case containing solid rocket fuel;
 a combustion chamber assembly adjustably coupled to the case;
 a sealing system connected to the combustion chamber assembly, the sealing system including a pair of grooves defined in a portion of the combustion chamber assembly adjacent to the case, a fluid compartment defined in the portion of the combustion chamber assembly adjacent to the case and positioned between the pair of grooves, seals disposed in the pair of grooves and positioned adjacent to the case, a fluid supply system connected to the fluid compartment, and a fluid pressure control system connected to the fluid supply system;
 a nozzle connected to the combustion chamber assembly; and
 a drive system coupled to the combustion chamber assembly and the case.

2. The booster of claim 1, wherein the fluid supply system includes a fluid container, a fluid channel connecting the fluid container to the fluid compartment, and a pump connected to the fluid channel.

3. The booster of claim 2, wherein the fluid pressure control system includes a pressure control valve connected to the fluid channel, a pressure modulator connected to the pressure control valve, and a pressure transducer connected to the pressure modulator.

4. The booster of claim 1, wherein the pair of grooves includes:
 a lower seal groove defined in the portion of the combustion chamber adjacent to the case and positioned between the fluid compartment and an interior cavity of the combustion chamber; and
 an upper seal groove defined in the portion of the combustion chamber adjacent to the case and positioned above the lower seal groove.

5. The booster of claim 1, wherein:
 the seals in the lower seal groove including a pair of rings having one or more notches and oriented so that the notches on each of the rings are misaligned; and
 the seals in the upper groove include an elastomer ring and a backing ring.

6. The booster of claim 1, wherein the combustible case includes a graphite epoxy resin composite material, a combustion enhanced epoxy resin, a layer of oxidizer rich fuel, powdered combustible metal, combustible metal threads, or any combination thereof.

7. The booster of claim 1, wherein the drive system including a plurality of threaded rods rotatably connected to the combustion chamber assembly and a motor or engine coupled to the plurality of threaded rods.

8. The booster of claim 7, wherein each of the plurality of threaded rods includes a steel threaded outer layer and a graphite epoxy composite core.

9. The booster of claim 1, further comprising an oxidizer supply system connected to the combustion chamber.

10. A rocket booster, comprising:
a combustible case containing solid rocket fuel, the combustible case including a graphite epoxy resin composite material, a combustion enhanced epoxy resin, a layer of oxidizer rich fuel, magnesium powder, magnesium threads, or any combination thereof;
a combustion chamber assembly adjustably coupled to the case and having an associated combustion chamber pressure, the combustion chamber assembly including:
   a fluid compartment defined in a portion of the combustion chamber assembly adjacent to the case and containing a fluid, the fluid having a fluid pressure that is greater than the combustion chamber pressure;
   a lower seal groove defined in the portion of the combustion chamber assembly adjacent to the case and positioned between the fluid compartment and an interior cavity of the combustion chamber assembly;
   an upper seal groove defined in the portion of the combustion chamber assembly adjacent to the case and positioned above the lower seal groove; and
   seals inserted into the upper and lower seal grooves and positioned adjacent to the case;
a nozzle connected to the combustion chamber assembly; and
a drive system coupled to the combustion chamber assembly and the case.

11. A rocket booster, comprising:
a combustible case containing solid rocket fuel;
a combustion chamber assembly adjustably coupled to the case;
sealing means for coupling the combustion chamber assembly to the combustible case, the sealing means including sufficient fluid to prevent gases from passing between the combustion chamber assembly and the combustible case;
a nozzle connected to the combustion chamber assembly; and
a drive system coupled to the combustion chamber assembly and the case.

12. The rocket booster of claim 11, wherein the sealing means includes a fluid supply means for supplying the fluid used to prevent gasses from passing between the combustion chamber assembly and the combustible case.

13. The rocket booster of claim 11, wherein the sealing means includes a fluid pressure control means for causing the fluid in the sealing means to have a fluid pressure that prevents gasses from passing between the combustion chamber assembly and the combustible case.

14. The booster of claim 11, wherein the sealing means includes a pair of grooves defined in a portion of the combustion chamber assembly adjacent to the combustible case and a fluid compartment defined in the portion of the combustion chamber assembly adjacent to the case and positioned between the pair of grooves.

15. The booster of claim 14, wherein the sealing means includes seals disposed in the pair of grooves and positioned adjacent to the case.

16. The booster of claim 15, wherein the sealing means includes a fluid supply system connected to the fluid compartment.

17. The booster of claim 16, wherein the sealing means includes a fluid pressure control system connected to the fluid supply system.

18. A method of generating thrust using a solid rocket booster, the booster including a combustible case containing solid rocket fuel, a combustion chamber adjustably coupled to the case using a sealing system, and a nozzle connected to the combustion chamber, comprising the steps of:
   burning the case and fuel in the combustion chamber and expelling the burned case and fuel out through the nozzle to generate thrust;
   moving the combustion chamber and nozzle up the case as the case and fuel burn; and
   injecting fluid into a portion of the sealing system to prevent combustion leaks while burning the case and fuel.

19. The method of claim 18, further comprising the step of controlling the injection of fluid so that the fluid has a fluid pressure that is greater than a combustion chamber pressure associated with the combustion chamber.

* * * * *